United States Patent
Rushing

Patent Number: 5,232,395
Date of Patent: Aug. 3, 1993

[54] FISH SCALING DEVICE

[76] Inventor: Harold W. Rushing, 725 McBride, St. Helens, Oreg. 97018

[21] Appl. No.: 929,391

[22] Filed: Aug. 14, 1992

[51] Int. Cl.[5] ............................................. A22B 5/08
[52] U.S. Cl. .................................... 452/105; 452/98; 30/169
[58] Field of Search ............... 452/98, 105, 94; 30/169, 172; 99/584

[56] References Cited

U.S. PATENT DOCUMENTS

| | | | |
|---|---|---|---|
| 24,178 | 4/1895 | Hoffman | 30/169 |
| 1,028,736 | 6/1912 | Kell | 452/105 |
| 2,148,944 | 2/1939 | Helm | 452/105 |
| 2,338,647 | 1/1944 | Koon | 452/105 |
| 4,275,476 | 6/1981 | Hopkins et al. | 30/169 |
| 4,297,765 | 11/1981 | Altman et al. | 452/105 |

FOREIGN PATENT DOCUMENTS 827847  1/1952  Fed. Rep. of Germany ...... 452/105

*Primary Examiner*—Willis Little
*Attorney, Agent, or Firm*—Eugene M. Eckelman

[57] ABSTRACT

A block-type body member has a handle on the top thereof and a depending flange on the bottom. The flange is curved outwardly and terminates in a sharpened wavy cutting edge capable of moving under fish scales for removing the scales when the device is rubbed against the fish. In a first embodiment, the cutting edge extends around the outer defining portion of the body member and in another embodiment the cutting edge depends from triangular bottom wall areas disposed inwardly of the outer defining portion of the body member. The handle has a recessed fit in the body member and preferably comprises a semi-resilient material providing a good grip on the device.

6 Claims, 2 Drawing Sheets

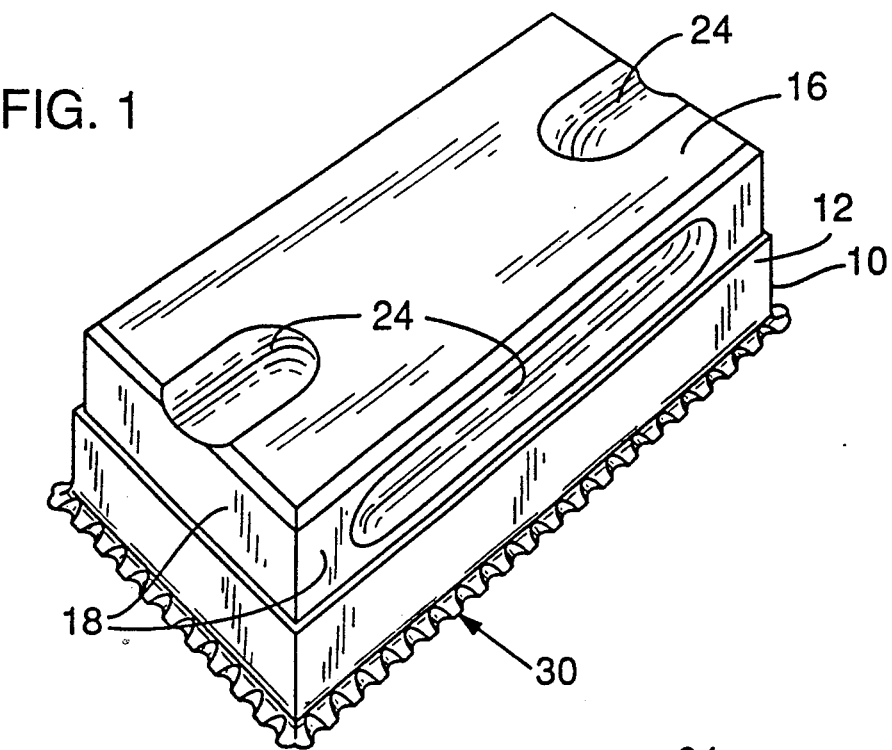
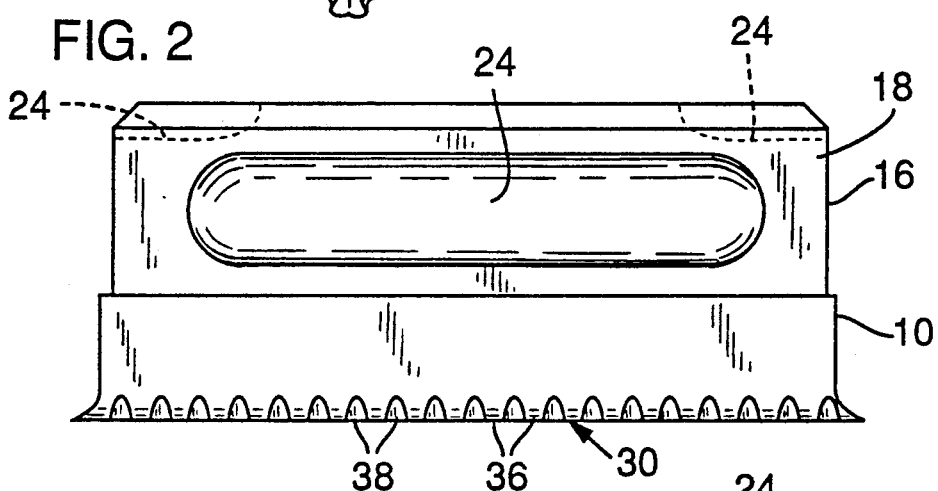
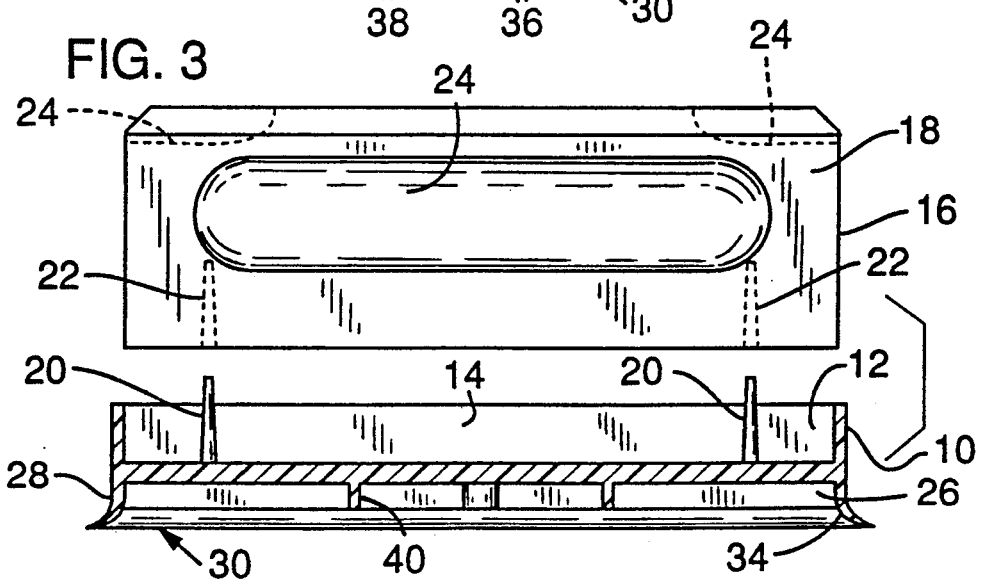

FISH SCALING DEVICE

BACKGROUND OF THE INVENTION

This invention relates to new and useful improvements in fish scaling devices.

Manual fish scalers have been of varying structures. One in common use comprises a hunting knife-type structure, namely, an instrument having a gripping handle and a blade similar to a hunting knife blade. The blade has serrations on one edge that are used for cutting or scraping off scales of a fish. This type of scaler and others as well have disadvantages one of which is that the handle is difficult to hold onto after the handle gets wet and slippery. Also, the serrations on the blade are difficult to guide properly along the surface of the fish for effectively removing the scales. Furthermore, unless the operator is extremely careful, the knife-type instrument will cut and gouge the fish unless extreme care is exercised.

SUMMARY OF THE INVENTION

According to the present invention and forming a primary objective thereof, a manual fish scaler is provided that overcomes disadvantages of previous scalers.

More particularly, objects of the invention are to provide a fish scaler that allows a firm type grip to be obtained thereon even though the device is wet and slippery; that includes a cutting or scraping edge in an improved arrangement and structure such that it more efficiently engages and remove scales; and that can be operated without cutting or gouging the fish.

In carrying out the objectives of the invention, the fish scaling device includes a body member with upper and lower portions. The upper portion comprises a handle by means of which the device can be gripped firmly for rubbing the device against the surface of the fish. A cutting edge is provided on the lower portion of the body member which is capable of moving under and cutting scales on the fish. The cutting edge is disposed on a depending flange or wall extending from the lower portion of the body member and curved outwardly at the bottom thereof into the cutting edge that is approximately parallel with the body member. This cutting edge is capable of moving under fish-scales and removing them.

BRIEF DESCRIPTION OF THE DRAWINGS

FIG. 1 is a perspective view of a first embodiment of the present fish scaling device.

FIG. 2 is a side elevational view of the device showing the mounted positioning of the handle portion in the body member.

FIG. 3 is a longitudinal sectional view and showing the upper handle portion removed.

DETAILED DESCRIPTION OF A PREFERRED EMBODIMENT

Figure 4:
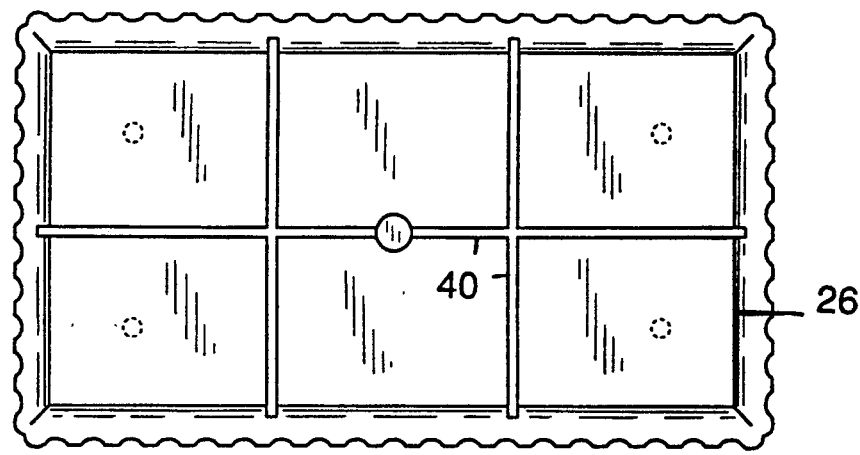
FIG. 4 is a bottom plan view of the device.

With particular reference to the drawings and first to FIGS. 1-4 which show a first embodiment of the invention, the invention comprises a body member 10 having vertical side and end walls 12 and a top recess 14. The recess 14 receives a block-type handle portion 16 having side and end walls 18 of a selected dimension whereby to fit snugly in the recess 14 of the body member. Stabilizing pins 20 project integrally from the bottom of the recess 14 and are of a length to snugly engage matching apertures 22 leading up from the bottom of the handle portion 16. The handle portion is held firmly in place by its snug engagement in the recess 14 and by the pins 20, although if desired it may be adhesively secured in place as well.

The handle portion 16 is constructed of a material of a structure that has a friction surface such as a semi-resilient foam plastic or rubber. Also, the sides and top of the handle portion have finger depressions 24 which together with the friction structure of the handle portion allow the operator to get and maintain a firm grip on the device even though the hands and handle are slippery.

The body member 10 has a bottom recess 26 forming a depending flange or skirt portion 28 around the bottom of the body member. The flange portion 28 curves outwardly and terminates at the bottom in a wavy cutting edge 30 that engages and removes the fish scales when the device is rubbed against the surface of a fish. The flange has an outwardly curved portion 34 that terminates in the cutting edge 30. This cutting edge comprises sharpened edge segments 36 separated by valleys 38. Valleys 38 taper to a width at the bottom in edges that are approximately the same width as straight edges between the valleys. The curved portions 34 of the flange portion are of an approximately ninety degree arc whereby the edge segments 36 and 38 extend horizontal or parallel with the body member 10. The bottom of edge segments 36 and the valleys 38 form a straight continuous cutting edge. The bottom recess 26 has reinforcing ribs 40 for strength.

Figure 5:
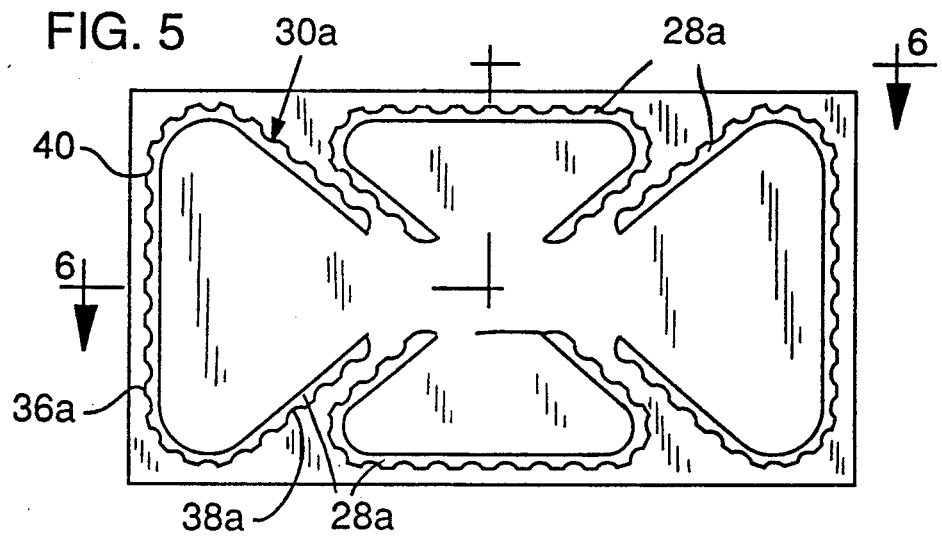
FIG. 5 is a bottom plan view of a second embodiment of the invention.
Figure 6:
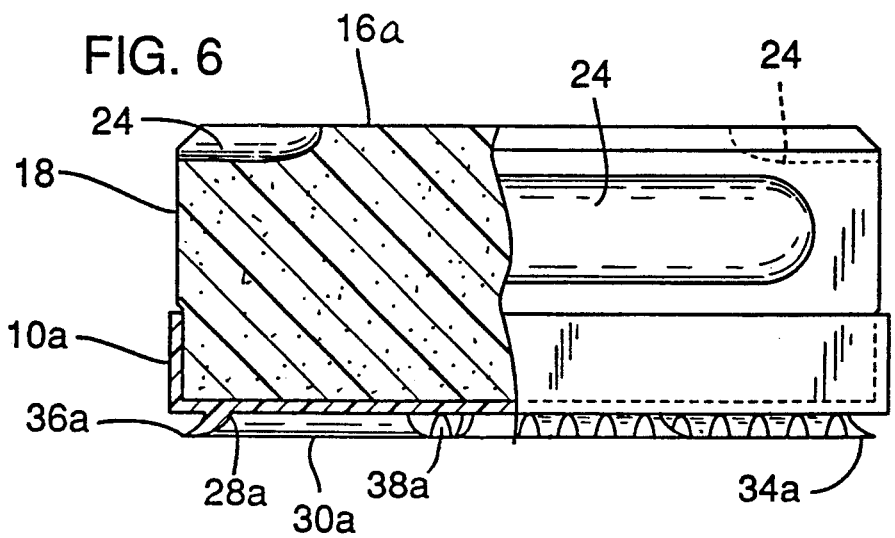
FIG. 6 view taken on the line 6—6 of FIG. 5.

In the embodiment of FIGS. 5 and 6, the body member 10a and handle 16a have a similar structure and connection as that shown in the FIG. 1 embodiment. However, a different arrangement of cutting areas is present in that the body member does not have a bottom recess and a defining flange but instead employs a plurality of bottom depending walls 28a forming triangularly shaped areas 40 which have a cutting edge 30a on the bottom thereof. These cutting edges are identical in structure to those defined in connection with FIG. 1, namely, flanges 28a have an outwardly curved portion 34a terminating at the bottom in a sharpened wavy cutting edge segments 36a and 38a. A preferred arrangement is to provide four of the triangular areas, as shown, with such areas having the apex of each one directed toward a central point of the body member. The cutting edges 30a on these triangular areas do not extend all the way around the lower end of the areas but extend fully at least along those straight edges that are parallel with the sides and ends of the body member. In any one direction of scraping movement by the body member, there is a full continuous line of the scales. Removed scales are free to move through the areas between the triangular areas without plugging.

According to the present invention, a fish scaling device is provided that allows the operator to get a good grip on the device so that even though it becomes wet and slippery, it can still be held onto with a firm engagement. The semi-resilient handle portion and its finger notches contribute to this improved feature and also provide a comfortable engagement for the operator's hand. The shape of the cutting edge, namely, the depending flange and the curved bottom portion with the straight and flat cutting edge segments that slip under the scales and cut them, provides a most efficient scaling procedure. This efficient engagement under the scales reduces the effort required to operate the device.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A fish scaling device comprising a body member having upper and lower portions, said lower portion having a horizontal surface and an outer defining edge, said upper portion comprising a handle by means of which the device is capable of being held in the hand for rubbing the device against the surface of a fish, and cutting means on said lower portion of said body member capable of engaging and removing scales on a fish when the device is rubbed against the fish, said cutting means comprising a depending flange extending from the lower portion of said body member and comprising an outwardly curved portion leading into a sharpened edge substantially parallel with the horizontal surface of said body portion and capable of moving under fish scales for removal thereof when the device is rubbed against the surface of the fish.

2. The fish scaling device of claim 1 wherein said horizontal surface is defined by an outer edge and said flange extends substantially vertical downwardly from said outer edge.

3. The fish scaling device of claim 1 wherein said handle comprises a block-type structure with a friction gripping surface.

4. A fish scaling device comprising a body member having upper and lower portions, said upper portion comprising a handle by means of which the device is capable of being held in the hand for rubbing the device against the surface of a fish, said handle having a recessed fitted engagement into said lower portion of said body member, stabilizing pins secured between said handle and said lower portion, and cutting means on said lower portion of said body member capable of engaging and removing scales on a fish when the device is rubbed against the fish, said cutting means comprising a depending flange extending from the lower portion of said body member and comprising an outwardly curved portion leading into a sharpened edge substantially parallel with said body portion and capable of moving under fish scales for removal thereof when the device is rubbed against the surface of the fish.

5. A fish scaling device comprising a body member having upper and lower portions, said lower portion having a horizontal surface and an outer defining edge, said upper portion comprising a handle by means of which the device is capable of being held in the hand for rubbing the device against the surface of a fish, and cutting means on said lower portion of said body member capable of engaging and removing scales on a fish when the device is rubbed against the fish, said cutting means comprising a depending wall extending from the lower portion of said body member inwardly of said defining edge, the bottom of said wall comprising an outwardly curved portion leading into a cutting edge substantially parallel with said body portion and capable of moving under fish scales for removal thereof when the device is rubbed against the surface of the fish.

6. The fish scaling device of claim 5 wherein said depending wall is triangular in shape, said cutting edge being disposed on defining edges of said depending wall.

* * * * *